United States Patent [19]

Kolff

[11] Patent Number: 5,033,843

[45] Date of Patent: Jul. 23, 1991

[54] REAR PROJECTION SCREEN ASSEMBLY

[75] Inventor: Albert Kolff, New Canaan, Conn.

[73] Assignee: Albert Kolff Architects, P.C., New Canaan, Conn.

[21] Appl. No.: 322,088

[22] Filed: Mar. 10, 1989

[51] Int. Cl.[5] .............................................. G03B 21/10

[52] U.S. Cl. ...................................... 353/122; 353/44; 353/77; 350/121

[58] Field of Search .................................... 353/74–78, 353/119, 44, 28, 122; 350/117, 118, 121, 122; 248/1 A, 166, 169, 171

[56] References Cited

U.S. PATENT DOCUMENTS

| | | | |
|---|---|---|---|
| 1,416,154 | 5/1922 | Ahbe | 353/44 X |
| 3,205,772 | 9/1965 | Guske | 350/117 |
| 3,741,624 | 6/1973 | Kuntz | 353/44 X |
| 3,749,472 | 7/1973 | Young | 350/121 |
| 3,950,085 | 4/1976 | Grimm | 353/77 X |
| 4,408,850 | 10/1983 | Norek | 33/1 M X |

FOREIGN PATENT DOCUMENTS

| | | | |
|---|---|---|---|
| 1146216 | 3/1969 | United Kingdom | 353/44 |

*Primary Examiner*—Harry N. Haroian
*Attorney, Agent, or Firm*—Curtis, Morris & Safford

[57] ABSTRACT

A rear projection screen assembly comprising a transparent screen suitable for passage therethrough of a light beam emanating from a rear projector apparatus, means for supporting the screen such that it is positionable to intercept the light beam, means in operative association with the screen, for supporting at least one sheet of translucent material, such that the transluscent material can be releasably fixed to the screen adjacent a screen surface opposite the screen surface first encountered by the light beam; and a kit suitable for construction of a rear projection screen assembly; and further includes a method of graphically modifying an image projected by a rear projection apparatus.

13 Claims, 1 Drawing Sheet

FIG. 1
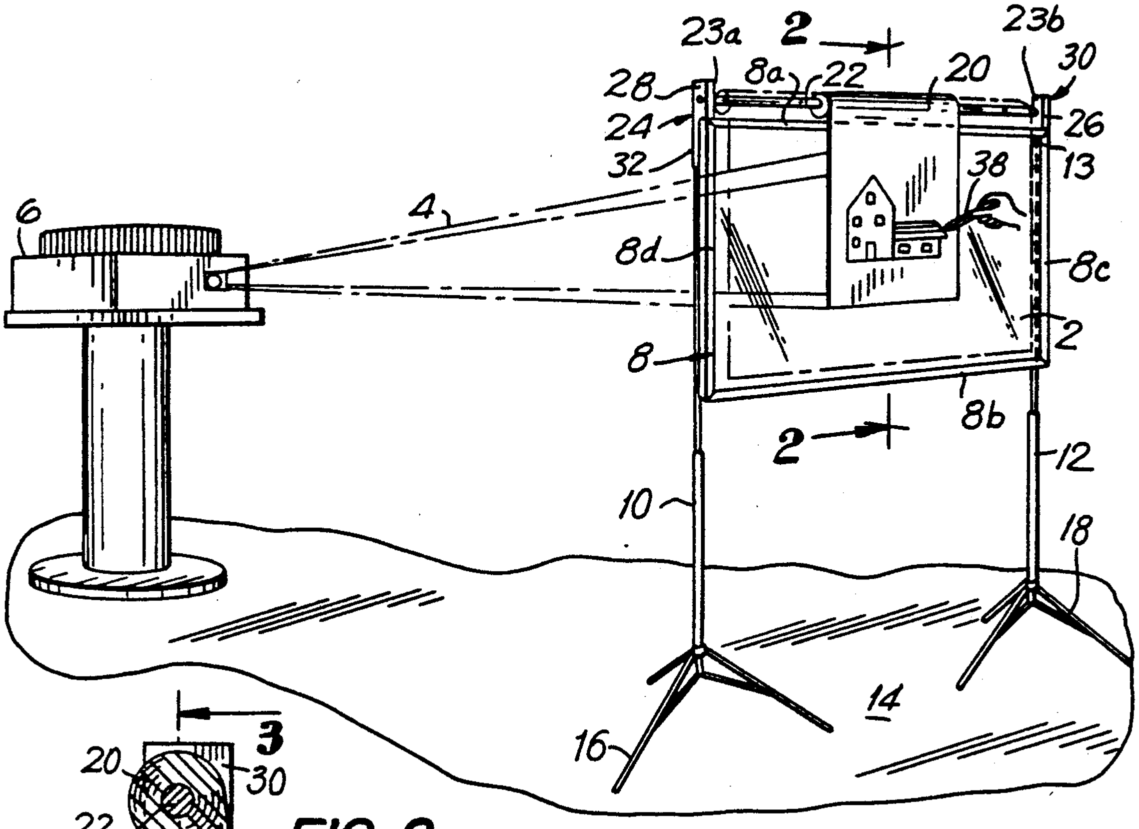
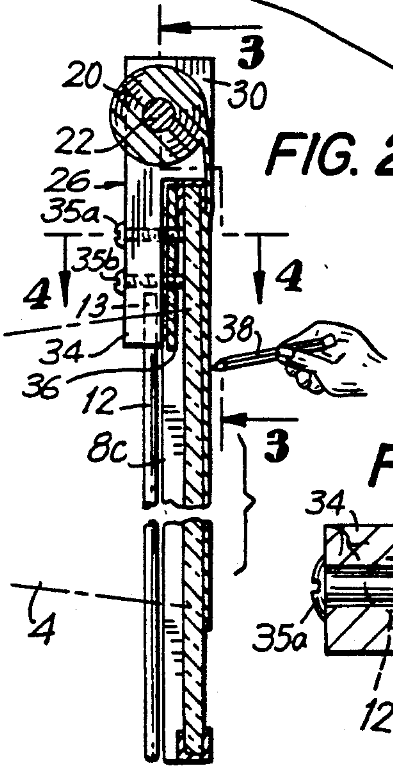
FIG. 2
FIG. 3
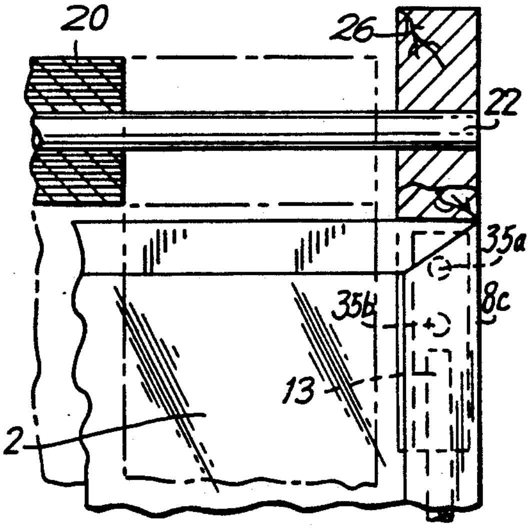
FIG. 4
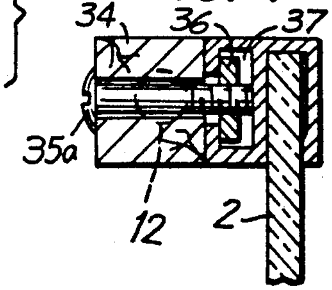

REAR PROJECTION SCREEN ASSEMBLY

BACKGROUND OF THE INVENTION

1. Field of the Invention

This invention relates generally to equipment and techniques suitable for communicating information graphically.

2. Background of the Invention

It is known in the art to utilize a slide projection screen, standard projection screen, overhead projection system or flip chart as a graphic aid in making a presentation of information in professional, sales, teaching and like fields. However, all of these systems are disadvantageously inflexible because they do not lend themselves to handwritten or hand-drawn modification during a presentation, of the information they are initially adapted to communicate—such modification reflecting, for instance, conceptual changes growing out of discussion and development of an initially presented theme or idea during a presentation, seminar, etc.

More specifically, slide projection equipment is a relatively rigid system not well-suited to "on the spot" modification of the subject matter set forth on the slide(s) because during such modification the image appearing on the screen is obscured by shadows caused by a hand, or head of the person modifying the projected image, or even by the implement used to make the modification. Standard projection equipment is unsuitable for analogous reasons.

The overhead projection system is similarly unsuitable. Due to the movement of the overlay during modification, the system provides an unstable image. Further, the scale of the working surface is typically confined to, at most, a twelve inch by twelve inch image.

A flip chart is likewise unsuitable because it offers limited means in which to update the studio-prepared material initially set forth. Further, the size of the image is fixed, which limits the flip chart's adaptability as a tool for presenting modifications clearly. Worse yet, changes to the information on the chart's pages, once made, are typically permanent, making difficult (if not infeasible) any further revision during the presentation—not to mention removal of the modification so as to return the pages to their initial state. The flip chart is thus, effectively, unusable for subsequent related presentations of the original data.

And, while use of a conventional rear projection screen system may diminish some of the aforementioned difficulties, it also is problematical. For example, the image presented on the screen is not well-defined and does not allow for accurate tracing of the projected image for artistic renderings of a real photographic image.

OBJECTS OF THE INVENTION

Accordingly, it is an object of this invention to provide an apparatus and method for making a graphic presentation which is sufficiently flexible to permit ready and economical "on the spot" modification during such presentation of materials initially prepared therefor.

It is yet another object of this invention to provide an apparatus, and a method, the means for implementing which are portable.

It is a still another object of this invention to provide apparatus and a method which are technologically convenient to utilize, and which make use of readily available supplies.

It is a further object of this invention to provide an apparatus and a method for projecting an image which can be hand-modified without shadowing or otherwise obscuring the projected image.

SUMMARY OF THE INVENTION

In accordance with one aspect of this invention, a rear projection screen assembly is provided, which comprises a transparent screen suitable for passage therethrough of a light beam emanating from projector apparatus, means for supporting the screen such that it is positionable to intercept the light beam, means in operative association with the screen for supporting at least one sheet of translucent material such that the translucent material can be releasably fixed adjacent the surface of the transparent screen opposite the screen surface first contacted by the light beam.

In another aspect, the invention is in a kit suitable for construction of a rear projection screen assembly comprising the following separate elements adapted for combination with one another to form said assembly: a transparent screen suitable for passage therethrough of a light beam emanating from rear projector apparatus; means for supporting said screen such that it is positionable to intercept said light beam; translucent material in sheet form; means adapted for operative association with said screen, for supporting at least one sheet of translucent material, such that said translucent material can be releasibly fixed to the screen adjacent the surface opposite the screen surface first encountered by said light beam.

In yet another embodiment, the invention is in a method of graphically modifying an image projected by rear projection apparatus, which comprises the steps of displaying said image on a sheet of translucent material releasably fixed to a transparent screen positioned to intercept a beam of light emanating from said apparatus, said sheet of translucent material being adjacent a surface of the screen opposite the screen surface first encountered by said light beam and being capable of retaining thereon a visible inscription, and marking said sheet of translucent material, at a location where the image appears, with an interactive tool such that a visible inscription is made on the material.

The above, and other objects, features and advantages of this invention, will be apparent in the following detailed description of the illustrative embodiment thereof which is to be read in connection with the accompanying drawings and in which corresponding parts are identified by the same reference numerals in the several views.

BRIEF DESCRIPTION OF THE DRAWINGS

FIG. 1 is a perspective view of the rear projection screen assembly according to an embodiment of this invention;

FIG. 2 is a side cross-sectional view taken along line 2—2 of FIG. 1;

FIG. 3 is a partial side cross-sectional view taken along line 3—3 of FIG. 2; and FIG. 4 is a cross-sectional view taken along line 4—4 of FIG. 2.

DESCRIPTION OF A PREFERRED EMBODIMENT

Referring initially to FIG. 1, it will be seen that a rear projection screen assembly in accordance with an embodiment of the present invention generally comprises a transparent screen 2 suitable for passage therethrough of a light beam 4 projected by a rear projector apparatus 6. The transparent screen 2 includes a frame 8 that includes a top member 8*a*, bottom member 8*b*, and two side members 8*c* and 8*d*, respectively, which interconnect the top and bottom members. The rear projection screen assembly further includes means for supporting the screen 2 such that is is positionable to intercept the projected light beam 4. This support means includes first and second members, 10 and 12, respectively, adapted to extend downwardly from the screen 2 to a surface 14 on which the assembly is to be mounted. The first and second members, 10 and 12, respectively, are of telescopic construction such that their length can be adjusted. Further, these first and second members, 10 and 12, have tripod bases 16 and 18, respectively.

A sheet of translucent material 20 is disposed adjacent the surface of the transparent screen 2 opposite the screen surface first contacted by the projected light beam 4. The translucent material is releasably fixed to the screen, for instance, by clips or due to static charge attraction between the material and the screen. The sheet can be removed and replaced at will, but until removal, stays in position on the screen, even when it is being marked with illustration, text, etc.

Means for supporting this translucent material 20 includes a cylindrical pole 22 located immediately adjacent the top member 8*a* of the frame 8 of the transparent screen 2. This pole 22 has a first free end 23*a* and a second free end 23*b*.

The screen 2, the first and second members, 10 and 12, and the cylindrical pole 22 to support the translucent material 20, are all secured by combination means, in this case, a first mounting block 24 and a second mounting block 26. These mounting blocks 24 and 26 support these elements in a configuration that enables an image from the projector 6 to be focused on the translucent material 20 and graphically modified "on the spot", e.g., by a professional during a presentation. These mounting blockings, 24 and 26, are of a substantially inverted-L configuration, have upper portions 28 and 30, respectively, and base members 32 and 34, respectively.

As seen in FIG. 3, one free end 23*b* of the cylindrical pole 22 passes through the upper portion 30 of the second mounting block 26. The upper end 13 of second member 12 extends upwardly into the base member 34 of mounting block 26.

Similarly, the other free end 23*a* of the cylindrical pole 22 extends into the upper portion 28 of mounting block 24 (not shown in cross-section for purposes of simplicity and avoiding redundancy). The upper end 11 of the first member 10 extends upwardly into the base member 32 of mounting block 24.

Frame 8 of the transparent screen 2 is attached to the mounting blocks 24 and 26. Side member 8*c* is attached to the base member 34 of mounting block 26. Screws 35*a* and 35*b* are extended through the base member 34 of mounting block 26 to a threaded plate 36 that fits inside the channel 37 of side member 8*c* of frame (FIG. 3 and FIG. 4). Side member 8*d* is attached to base member 32 of mounting block 24 by screws in the same manner as side member 8*c* (not shown in cross-section for purposes of simplicity and avoiding redundancy).

As seen in FIG. 2, a roll of translucent material 20 is located on the cylindrical pole 22; this material can be perforated at appropriate intervals for ease of separation. Translucent material 20 is disposed adjacent the surface of the transparent screen 2 opposite the screen surface first encountered by the light beam 4. An interactive tool 38 is used to modify the image that is located on the translucent material 20.

In another embodiment of this invention, a pre-cut sheet of paper 42 (not shown) can be disposed adjacent the transparent screen 2 by a static charge. Therefore, the need for a top support member to support the translucent material 20 is obviated (although it can still be advantageous to support a supply of translucent material is roll form on the member, so that replacement of already-marked sheet material can readily be effected).

In operation, the light beam emanating from the projector apparatus presents an image on the translucent material. The image can be modified by the invention's practitioner by making graphic inscriptions (such as drawing, text, individual characters, etc.) at or near the location of the image on the translucent material, while the image is being projected thereon. Method embodiments falling within this category are an important aspect of the invention.

The assembly of the invention is typically constructed utilizing a kit comprising some or all of the elements needed to practice the invention. The elements can be included separately, or in a partially assembled state, as desired. The kit is often conveniently contained in a box or other container in which it is stored for ease of shipment and protection of the elements from damage. The kit embodiments of the invention provide a convenient and effective mode for marketing the invention.

This rear projection screen assembly provides a powerful professional tool for interactive presentations. Because the projector is located at a distance behind the transparent screen 2 and the translucent material 20 is located adjacent the surface of the transparent screen 2 opposite the screen surface first encountered by the projected light beam 4, a stable image is provided and no shadow of pen, head or hand appears during graphic modification to obscure the image and interrupt the flow of the presentation. Because of this configuration, information can be added to studio prepared material during a presentation thereby providing a flexibility unavailable with other systems.

The present invention is a combination of readily available elements, and is therefore easily and economically implemented. The inventive assembly is simple, low-tech, and portable, comprised of replenishable supplies that can be store bought.

Although an illustrative embodiment of the invention has been described in detail herein, it is to be understood that the invention is not limited to the foregoing, and that various modifications and changes may be effected therein by one skilled in the art without departing from the scope or spirit of the invention as defined in the appended claims.

What is claimed is:

1. A rear projection screen assembly, which comprises a transparent screen suitable for passage therethrough of a light beam emanating from a rear projector;

means for supporting said screen such that it is positionable to intercept said light beam;

means in operative association with said screen, for supporting at least one sheet of translucent material, such that said translucent material can be releasably fixed to the screen adjacent a screen surface opposite the screen surface first encountered by said light beam; and mounting blocks to which said screen, said means for supporting the screen and said means for supporting said translucent material are secured.

2. A rear projection screen assembled as defined in claim 1, wherein said supporting means are detachably mounted such that the supply of translucent sheet material supported by it can be replenished.

3. A rear projection screen assembly as defined in claim 1, wherein said screen support means includes first and second members adapted to extend downwardly from said screen to a surface on which the assembly is to be mounted.

4. A rear projection screen assembly as defined in claim 3, wherein said first and second members are of telescopic construction such that their length can be adjusted.

5. A rear projection screen assembly as defined in claim 1, wherein said translucent material is paper or plastic.

6. A rear projection screen assembly as defined in claim 1, wherein said means for supporting said translucent material includes a cylindrical member on which the material is stored for use in roll form.

7. A rear projection screen assembly as defined in claim 1, which further comprises at least one sheet of precut translucent material, releasably fixed to the screen.

8. A kit suitable for construction of a rear projection screen assembly, which comprises the following separate elements adapted for combination with one another to form said assembly;

a transparent screen suitable for passage therethrough of a light beam emanating from rear projection apparatus;

means for supporting said screen such that it is positionable intercept light beam;

translucent material in sheet form;

means adapted for operative association with said screen, for supporting at least one sheet of translucent material, such that said translucent material can be releasably fixed to the screen adjacent the screen surface opposite the screen surface first encountered by said light beam, wherein said screen support means includes first and second members adapted to extend downwardly from said screen, after construction of said assembly, to a surface on which the assembly is to be mounted; and mounting blocks adapted for attachment to said screen, said support members and said means for supporting said translucent material.

9. A kit as defined in claim 8, which further comprises as another element as interactive tool for marking on said translucent material.

10. A kit as defined in claim 8, wherein said screen support means includes first and second members adapted to extend downwardly from said screen, after construction of said assembly, to a surface on which the assembly is to be mounted.

11. A kit as defined in claim 8, wherein said first and second members are of telescopic construction such that their length can be adjusted.

12. A kit, as defined in claim 8, wherein said translucent material is paper or plastic.

13. A kit, as defined in claim 8, wherein said means for supporting said translucent material includes a cylindrical member on which the material is stored of ruse in roll form.

* * * * *